(12) United States Patent
Sprecher et al.

(10) Patent No.: US 7,106,206 B2
(45) Date of Patent: Sep. 12, 2006

(54) CAPACITIVE OCCUPANT SENSOR FOR A VEHICLE SEAT

(75) Inventors: Phillip B. Sprecher, Noblesville, IN (US); William W. Fultz, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/145,707

(22) Filed: Jun. 6, 2005

(65) Prior Publication Data

US 2005/0231379 A1    Oct. 20, 2005

Related U.S. Application Data

(63) Continuation-in-part of application No. 10/643,044, filed on Aug. 18, 2003, now Pat. No. 6,927,678.

(51) Int. Cl.
*G08B 21/00* (2006.01)

(52) U.S. Cl. .................. 340/667; 340/545.4; 340/562; 200/85 A

(58) Field of Classification Search ................. 340/667
See application file for complete search history.

(56) References Cited

U.S. PATENT DOCUMENTS 5,984,349 A * 11/1999 Van Voorhies ............... 340/667
6,021,863 A * 2/2000 Stanley ........................ 280/735
6,056,079 A * 5/2000 Cech et al. .................. 340/667
6,260,879 B1 * 7/2001 Stanley ......................... 701/45
6,442,504 B1 * 8/2002 Breed et al. ................... 701/45
6,584,387 B1 * 6/2003 Norton ......................... 701/45
6,674,024 B1 * 1/2004 Cech et al. .................. 280/735
6,792,342 B1 * 9/2004 Breed et al. ................... 701/45
6,825,765 B1 * 11/2004 Stanley et al. .............. 340/562
6,927,678 B1 * 8/2005 Fultz et al. .................. 340/667
2005/0134442 A1 * 6/2005 Fultz et al. .................. 340/667
2005/0248136 A1 * 11/2005 Breed et al. ................. 280/735

* cited by examiner

*Primary Examiner*—Daniel Wu
*Assistant Examiner*—Eric M. Blount
(74) *Attorney, Agent, or Firm*—Scott A. McBain

(57) ABSTRACT

A capacitive occupant sensor for a seat has a dielectric in the form of a fluid-filled elastomeric bladder, and the sensor includes a primary region that is subjected to occupant force and a secondary region that is shielded from occupant force. The secondary region includes an appendage of the bladder that is disposed beneath a back cushion of the seat, either in a cavity of the seat cushion or below a frame element that supports the seat cushion. A spring clamp normally biases fluid out of the appendage, but occupant-related force applied over a broad area of the seat produces a flow of bladder fluid into the appendage against the bias force of the spring clamp. A pair of auxiliary conductor plates is oppositely disposed about the bladder appendage, and the capacitance between the auxiliary conductor plates is measured as an indication of fluid pressure in the bladder.

8 Claims, 3 Drawing Sheets

CAPACITIVE OCCUPANT SENSOR FOR A VEHICLE SEAT

RELATED APPLICATIONS

This application is a continuation-in-part of U.S. Patent application Ser. No. 10/643,044, filed Aug. 18, 2003 now U.S. Pat. No. 6,927,678.

TECHNICAL FIELD

The present invention is directed to a capacitive sensor including a fluid-filled bladder responsive to occupant-related force applied to a vehicle seat.

BACKGROUND OF THE INVENTION

Occupant detection and classification are frequently used in connection with air bags and other pyrotechnically deployed restraints for purposes of determining if the restraints should be deployed in the event of sufficiently severe crash. Various vehicle seat sensors have been devised for this purpose, such as disclosed, for example, in the U.S. Pat. Nos. 5,987,370 and 6,246,936 to Murphy et al., and the U.S. Pat. Nos. 6,101,436 and 6,490,936 to Fortune et al., all of which are assigned to Delphi Technologies, Inc., and incorporated herein by reference. In general, occupant presence can be detected based on the overall force applied to the seat, while reliably classifying the occupant additionally requires information about the distribution of the applied force.

The information required for occupant classification can be acquired in a cost-effective manner with a capacitive sensor array having a set of conductor plates separated by a compressible dielectric material. An electronic controller detects changes in capacitance between the plates when the thickness of the intermediate dielectric material changes due to the forces applied to the seat by an occupant. See, for example, the U.S. Pat. Nos. 4,836,033 to Seitz; 5,878,620 to Gilbert et al.; 6,448,789 and 6,591,685 to Kraetzl et al.; and 6,499,359 to Washeleski et al. As shown in the U.S. Pat. No. 4,836,033, for example, the distribution of the applied force can be determined by configuring one of the main conductor plates as an array of individual charge plates, and measuring changes in capacitance between each of the individual charge plates and the other plate.

Ideally, the dielectric material of a capacitive sensor should be relatively thin and locally compressible, and should have a dielectric constant that is not significantly influenced by variations in ambient humidity or temperature. The aforementioned U.S. patent application Ser. No. 10/643,044 discloses a particularly advantageous capacitive sensor in which the dielectric is implemented with a fluid-filled elastomeric bladder. When occupant-related seat force is applied to the sensor, fluid in the loaded region of the bladder is displaced to another region where the bladder can expand to accommodate the displaced fluid. However, as the area over which the occupant force is applied increases, the area of the bladder that is able to expand decreases, disturbing the relationship between capacitance change and applied force.

SUMMARY OF THE INVENTION

The present invention is directed to an improved capacitive occupant sensor for a seat, where the sensor dielectric is in the form of a fluid-filled elastomeric bladder, and the sensor includes a primary region that is subjected to occupant-related seat forces and a secondary region that is isolated or shielded from occupant-related seat forces. The secondary region is defined by an appendage of the bladder that is preferably disposed beneath a back cushion of the seat, either in a cavity of the seat cushion or below a frame element that supports the seat cushion. A spring clamp normally biases fluid out of the appendage, but occupant-related force applied over a large area of the seat produces a flow of bladder fluid into the appendage against the bias force of the spring clamp to maintain the relationship between capacitance change and applied force. The secondary portion of the sensor additionally includes a pair of auxiliary conductor plates oppositely disposed about the bladder appendage, and the capacitance between the auxiliary conductor plates is measured as an indication of fluid pressure in the bladder.

DESCRIPTION OF THE PREFERRED EMBODIMENT

Figure 1:
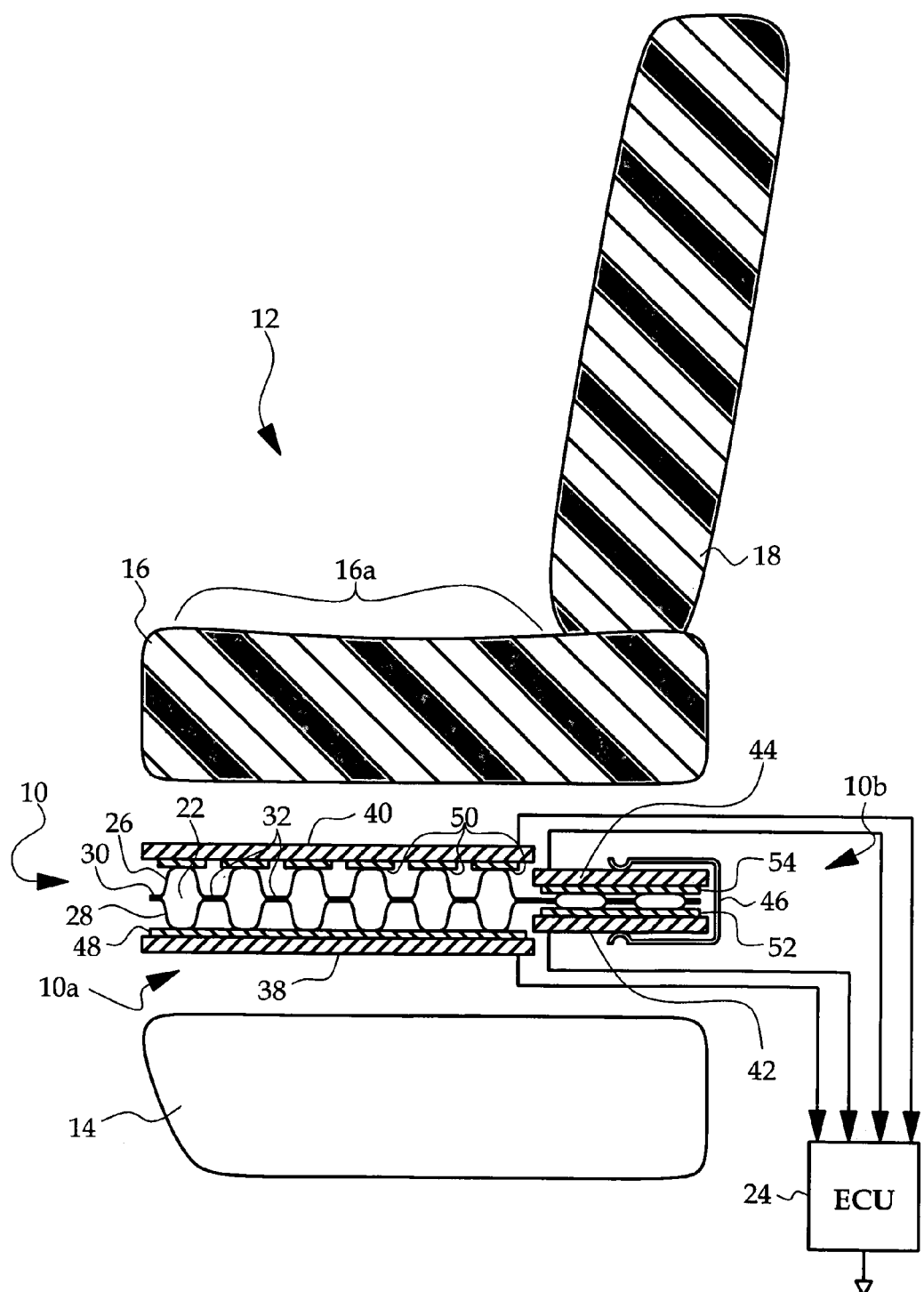
FIG. 1 is an exploded view of a vehicle seat equipped with a capacitive occupant sensor having a fluid-filled bladder dielectric according to this invention, and including a microprocessor-based electronic control unit coupled to the sensor.

Referring to FIG. 1, the reference numeral 10 generally designates the capacitive occupant sensor of this invention in the context of a vehicle seat 12 comprising a seat frame 14, a foam seat cushion 16 and a foam back cushion 18. The sensor 10 includes a primary region 10a and a secondary region 10b. The primary region 10a is disposed between the seat frame 14 and the seating surface 16a of seat cushion 16 so that occupant-related forces applied to the seating surface 16a are transmitted to primary region 10a through the seat cushion 16. One the other hand, the secondary region 10b is positioned such that it is shielded from forces applied to the seating surface 16a. In the illustration, this is achieved by locating the secondary region 10b under the back cushion 18; a more detailed discussion of various locations of the secondary region 10b is presented below in reference to FIGS. 3A–3B.

In general, the sensor 10 comprises various conductor plates oppositely disposed about a fluid-filled elastomeric bladder 22. The distances between such oppositely disposed conductor plates change in response to the application of occupant-related force to the seating area 16a of seat cushion 16, and an electronic control unit (ECU) 24 measures changes in capacitance between the plates. Capacitance measurement within ECU 24 may be cost-effectively implemented with an application-specific-integrated-circuit (ASIC) if desired. In a typical implementation, the ECU 24 grounds a first conductor plate, and couples an AC voltage to a second conductor plate via a resistor; in this case, the capacitance can be determined from the voltage across the respective conductor plates. Other capacitance measurement techniques can alternatively be employed.

Figure 2:
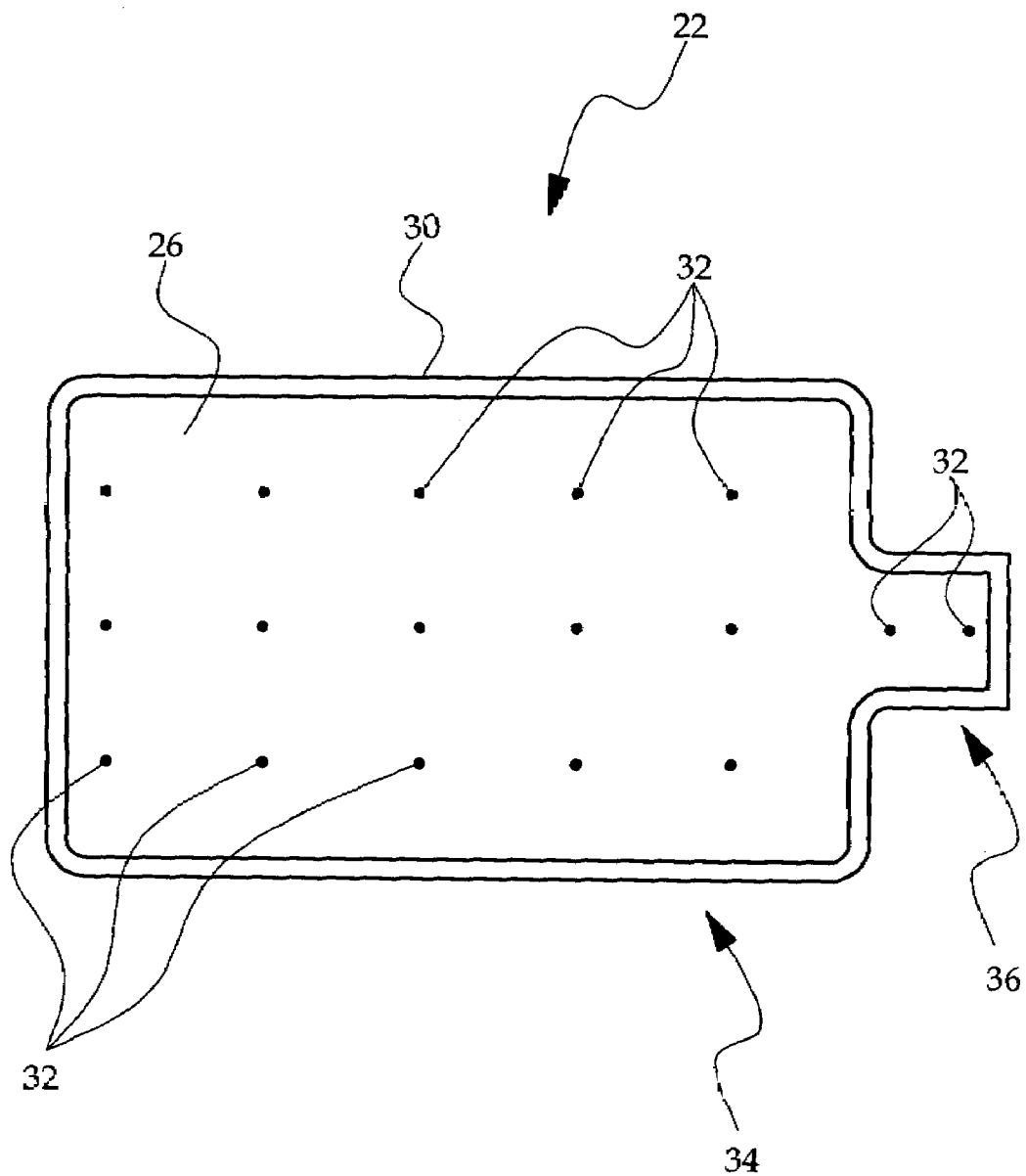
FIG. 2 is an overhead view of the fluid-filled bladder dielectric of the sensor of FIG. 1.

Referring to FIGS. 1 and 2, the bladder 22 comprises first and second elastomeric sheets 26, 28 joined at their periphery by a continuous weld 30, and at various points within the weld 30 by a pattern of spot welds 32. The bladder 22 is then filled with a fluid such as silicone which is non-corrosive and not subject to freezing or break-down at extreme ambient temperatures, and the fluid is free to flow within the bladder 22 subject to externally applied forces. The bladder 22 includes a main body portion 34 disposed in the primary region 10a of sensor 10, and an integral appendage 36 disposed in the secondary region 10b. A first pair of substrates 38, 40 is oppositely disposed about the main body portion 34, and a second pair of substrates 42, 44 is oppositely disposed about the appendage 36. The substrates 38, 40, 42, 44 are non-conductive, and may be formed of a material such as polyurethane. The substrates 38 and 40 are preferably very flexible, and may have a thickness of about 0.1 mm; the substrates 42 and 44 are relatively rigid, and may have a thickness of about 0.5 mm. A spring clamp 46 engages the second pair of substrates 42, 44 and biases them against the appendage 36 to squeeze the bladder fluid out of the appendage 36 and into the main body portion 34. As described below, occupant-related force applied to the seating area 16a of seat cushion 16 can increase the fluid pressure in bladder 22 and cause bladder fluid to flow from the main body portion 34 into the appendage 36, increasing the distance between the second pair of substrates 42, 44 in opposition to the bias force of spring clamp 46.

The substrates 38 and 40 in the primary region 10a of sensor 10 respectively support a reference plane conductor 48 and an array of charge plate conductors 50. The reference plane conductor 48 and each of the charge plate conductors 50 are separately coupled to ECU 24, which periodically measures capacitance values between the reference plane conductor 48 and each of the charge plate conductors 50. As indicated above, the application of occupant weight to the seating area 16a of cushion 16 loads the bladder 22, producing localized reductions in its thickness which are detected as changes in capacitance between the reference plane conductor 48 and respective charge plate conductors 50. The measured capacitances provide an indication of the force (weight) applied to the seating area 16a of seat cushion 16, as well as the distribution of the force, for purposes of detecting the presence of an occupant and classifying the occupant as a child, an adult, a child seat, or some other classification.

The substrates 42 and 44 in the secondary region 10b of sensor 10 respectively support the conductor plates 52 and 54. The conductor plates 52 and 54 are also separately coupled to ECU 24, which periodically measures the capacitance between plates 52 and 54. The capacitance in this case is indicative of the fluid pressure in bladder 22 under conditions where occupant-related force broadly distributed across the seating area 16a forces bladder fluid to flow into the appendage 36, increasing the separation distance of the conductor plates 52 and 54 against the bias force of spring clamp 46, and correspondingly reducing the measured capacitance.

In an unloaded state, the spring clamp 46 biases the substrates 42 and 44 against the appendage 36, squeezing nearly all of the bladder fluid out of appendage 36 and into to main body portion 34. As occupant-related force is applied to the seating area 16a of seat cushion 16, the force is transmitted to the main body portion 34 of bladder 22, usually in a localized manner, and the bladder fluid shifts into areas of the main body portion 34 where the bladder 22 can expand to accommodate the displaced fluid. The fluid pressure in the bladder generally increases in relation to the applied force, and may result in a flow of bladder fluid into the appendage 36 as well if the fluid pressure acting on the bladder surfaces within appendage 36 creates a force at least as large as the minimum bias force of spring clamp 46. The capacitances between the reference plane conductor 48 and respective charge plate conductors 50 provide an indication of the applied force and its distribution. The capacitance between the conductor plates 52 and 54 provides an indication of the fluid pressure in bladder 22, which in itself is a measure of the overall occupant-related force. In cases where the occupant-related force is applied over a large portion of the seating area 16a, the force is applied across a high percentage of the main body portion 34 of bladder 22, limiting the ability of the main body portion 34 to expand. In such cases, the fluid pressure in the bladder 22 rises and bladder fluid increasingly flows into appendage 36 as the fluid force overcomes the force of spring clamp 46. This reduces the separation distance between the reference plane conductor 48 and charge plate conductors 50 in the primary region 10a of sensor 10, while increasing the separation distance of the conductor plates 52 and 54 in the secondary region 10b. The capacitances between the reference plane conductor 48 and respective charge plate conductors 50 indicate an increasing and widely distributed occupant force, and the capacitance between the conductor plates 52 and 54 provides a secondary indication of the overall occupant-related force. The size of the appendage 36 may be chosen to provide adequate fluid volume to accommodate a maximum weight occupant distributed over the entire seating area 16a, and the spring constant of the spring clamp 46 should be calibrated to ensure prompt return of the appendage fluid to the main body portion 34 when the occupant vacates the seat 12.

Figure 3A:
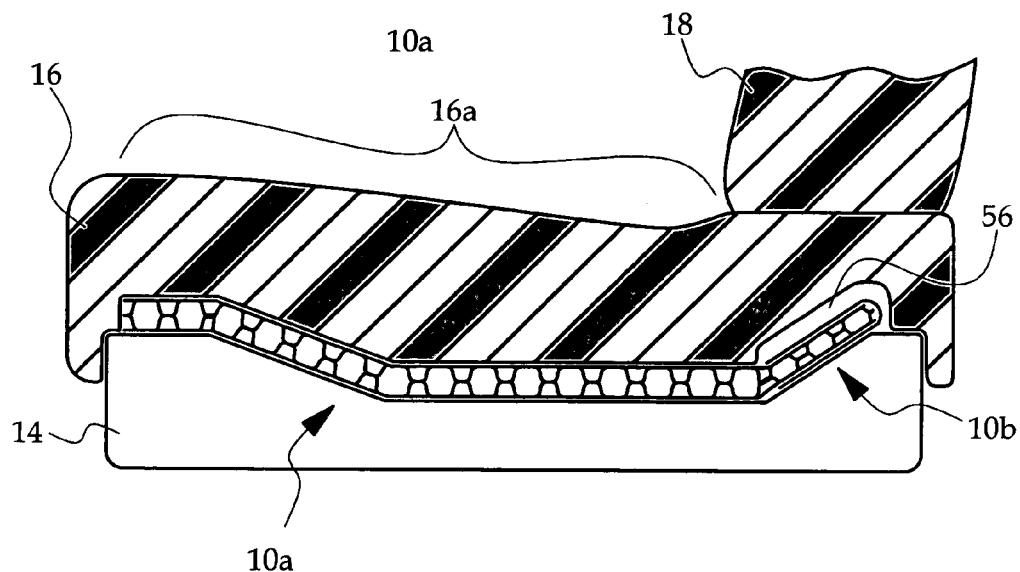
FIG. 3A depicts a first embodiment where the sensor of FIG. 1 is installed in a vehicle seat such that the secondary region of the sensor is disposed in cavity beneath a back cushion of the seat.
Figure 3B:
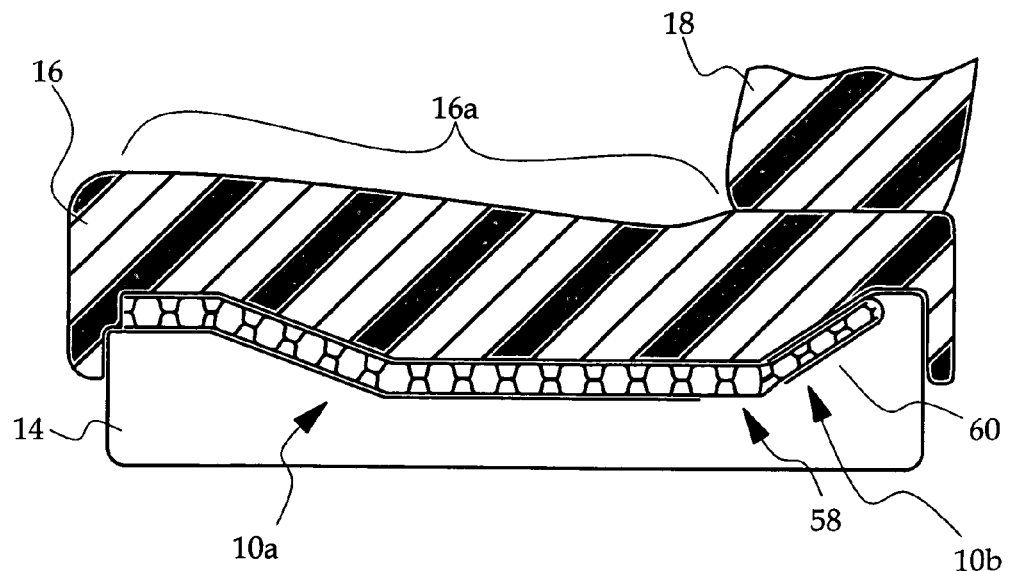
FIG. 3B depicts a second embodiment where the sensor of FIG. 1 is installed in a vehicle seat such that the secondary region of the sensor is disposed under a frame element that supports the seat cushion.

FIGS. 3A and 3B illustrate two possible ways of shielding the secondary region 10b of sensor 10 from occupant-related force while allowing the appendage 36 to expand against the bias force of spring clamp 46. In the embodiment of FIG. 3A, the entire sensor 10 is disposed between the seat frame 14 and seat cushion 16; the primary region 10a of sensor 10 is disposed under the seating area 16a of seat cushion 16, and the secondary region 10b is disposed in a seat cushion cavity or pocket 56 under the back cushion 18. In the embodiment of FIG. 31B, there is an opening 58 in the seat frame 14, and the secondary region 10b of sensor 10 is inserted through the opening 58 from the top of the frame 14 so that the primary region 10a is disposed on the frame 14 under the seating area 16a of seat cushion 16, and the secondary region 10b is disposed in an open area 60 under the seat frame 14. The opening 58 may be a suitably sized slot in seat frames that support the seat cushion 16 on a plastic or metal seat pan, or an opening between suspension wires in seat frames that support the seat cushion 16 on a wire grid, for example. Other installations are possible, depending on the design of the seat frame 14.

In summary, the present invention extends the range and enhances the accuracy of a capacitive occupant sensor in which the dielectric is a fluid-filled elastomeric bladder. While the sensor has been described in reference to the illustrated embodiment, it should be understood that various modifications in addition to those mentioned above will occur to persons skilled in the art. For example, the size and shape of the sensor 10 will vary depending on the geometry of the seat 12, and so on. Furthermore, it should be recognized that the term capacitance as used herein is simply a way of characterizing the change in electric field coupling between a pair of conductor plates, and any technique for measuring the change in such coupling is essentially equivalent for purposes of this invention. Accordingly, it is intended that the invention not be limited to the disclosed embodiment, but that it have the full scope permitted by the language of the following claims.

The invention claimed is:

1. Apparatus for sensing an occupant of a seat, the apparatus comprising:
   a capacitive sensor disposed in said seat including a fluid-filled elastomeric bladder dielectric and conductor plates oppositely disposed about said dielectric, where said sensor has a primary region to which occupant-related seat force is applied and a secondary region that is shielded from said occupant-related seat force, and spring means for resiliently biasing bladder fluid out of said secondary region and into said primary region until a pressure of said bladder fluid overcomes a bias force of said spring means.

2. The apparatus of claim 1, wherein said bladder includes a main body disposed in the primary region of said sensor and an appendage disposed in the secondary region of said sensor, said appendage being in fluid communication with said main body.

3. The apparatus of claim 2, wherein said spring means includes first and second substrates oppositely disposed about said appendage, and a spring clamp for producing said bias force by clamping said first and second substrates together.

4. The apparatus of claim 2, where said sensor includes first and second conductor plates oppositely disposed about said appendage, and a controller for determining said pressure based on a capacitance between said first and second conductor plates.

5. The apparatus of claim 1, wherein said seat includes a seating surface and a seat back, the primary region of said sensor being disposed under said seating surface, and the secondary region of said sensor being disposed under said seat back.

6. The apparatus of claim 5, where said seat includes a frame and a foam bottom cushion supported on said frame, where said cushion is shaped to define a cavity under said seat back, the secondary region of said sensor being disposed in said cavity.

7. The apparatus of claim 1, wherein where said seat includes a frame and a foam bottom cushion supported on said frame, the primary region of said sensor being disposed between said frame and said cushion, and the secondary region of said sensor being shielded from said occupant-related seat force by said frame.

8. The apparatus of claim 7, where said frame includes an opening through which the secondary portion of said sensor extends.

* * * * *